Figure 1:
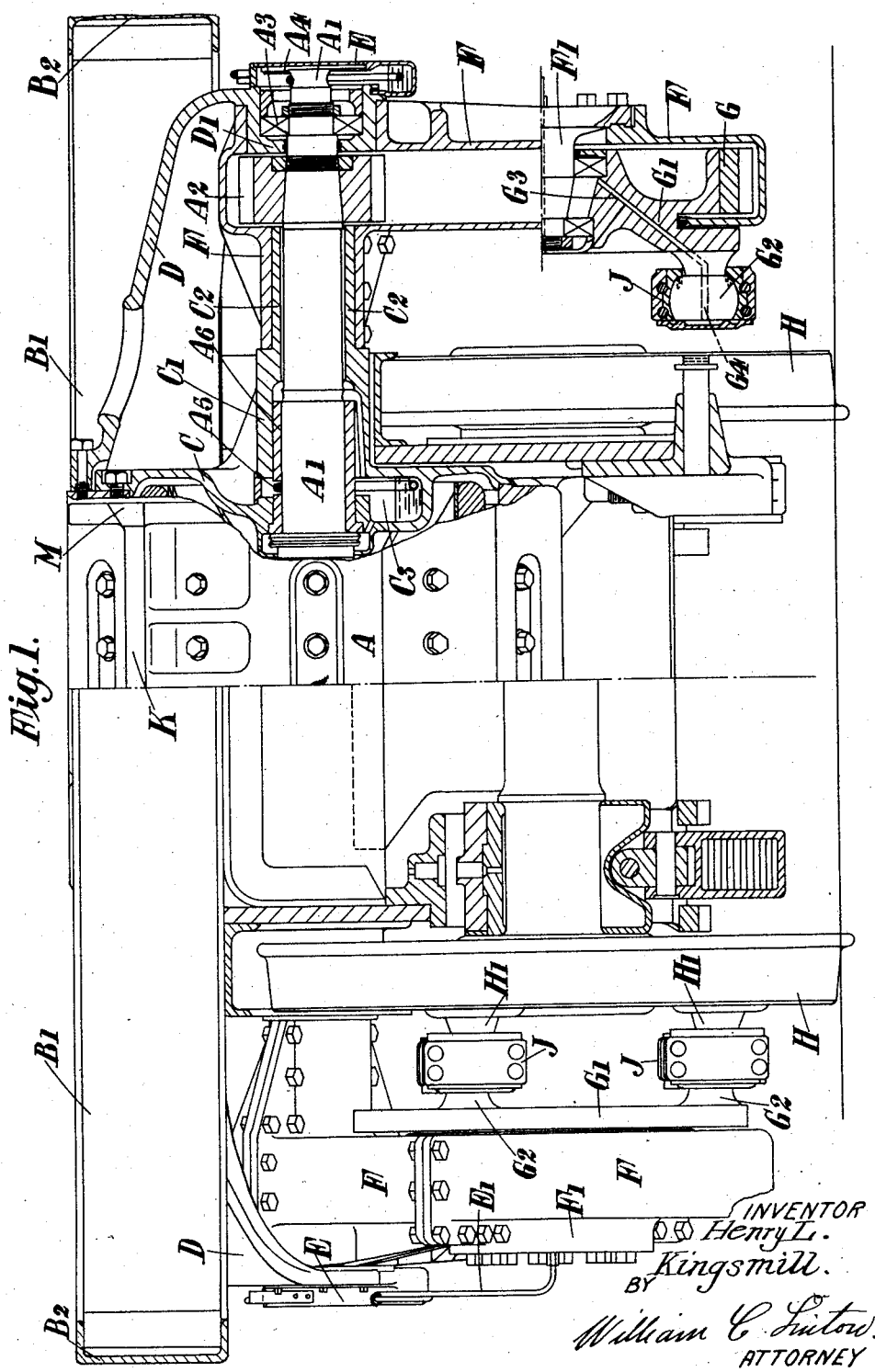

Oct. 22, 1929.  H. L. KINGSMILL  1,733,021
SHAFT AND LIKE COUPLING
Filed Oct. 13, 1928  3 Sheets-Sheet 3

INVENTOR
Henry L. Kingsmill.
BY
William C. Linton.
ATTORNEY

UNITED STATES PATENT OFFICE

HENRY LLEWELYN KINGSMILL, OF REDFERN, SYDNEY, AUSTRALIA

SHAFT AND LIKE COUPLING

Application filed October 13, 1928, Serial No. 312,369, and in Great Britain December 20, 1927.

This invention relates to couplings for transmitting power to the driving wheels of locomotives or like vehicles, especially electrically propelled locomotives.

In a common form of electrically propelled locomotive it is customary to transmit the power of a motor to the driving wheels or axle through a pinion mounted on the armature shaft and a gear wheel coupled to the driving wheels or axle, and this invention relates more especially to a locomotive of this type in which the gear wheel is mounted outside the driving wheel.

In arrangements adopted up to the present the gear wheel has been co-axial with or only slightly eccentric to the driving wheel, and as the armature shaft must clear the flange of the driving wheel for a given diameter of driving wheel there is a minimum distance between the armature axis and the gear wheel axis which can be adopted.

The maximum diameter of gear wheel which can be used is fixed by the necessary clearance from rail level, and up to the present it has been found that with this arrangement for a given size of driving wheel there is a maximum gear ratio which can be used. To obtain a larger ratio it is necessary to increase the driving wheel diameter. The increase in gear ratio thus obtained is however not sufficient for many purposes.

The object of this invention is to increase considerably the eccentricity of the gear wheel to the driving wheel beyond what has been customary, thus reducing the minimum distance between the armature axis and the gear wheel axis for a given diameter of driving wheel so that large gear ratios may be obtained by using a small pinion. With this invention it is not necessary to use a driving wheel and a gear wheel of large diameter in order to obtain a large gear ratio.

A further object of the invention is that for a given gear ratio the axis of the motor may be removed further from the driving axle than when the gear wheel is co-axial with the latter so that a larger and more powerful motor may be fitted.

According to the invention the coupling between the gear wheel and the driving wheel comprises three or more approximately horizontal links which all lie in the same plane and are each equal in length to the eccentricity of the gear wheel with respect to the driving wheel and which are connected at one end by universal joints to cranks arranged on the driving wheel symmetrically about its axis and which are connected at the other end by universal joints to cranks arranged on the gear wheel or on some part connected with the gear wheel symmetrically about its axis, the distance between a pair of adjacent cranks on the driving wheel or on the gear wheel being greater than the length of each link.

In an alternative arrangement the cranks may be borne by the links and may fit into sockets formed in the driving wheel and in the gear wheel.

As the links are approximately horizontal the driving wheel is free to move vertically through a small distance without displacing the gear wheel, but in order to compensate for wear in the axle box guides, inaccurate fitting, or slight obliquely in the links, the gear wheel may be mounted so that the horizontal distance between its axis and the axle box guides may vary to a limited extent.

In order to effect this movement the gear wheel may be mounted so that it is capable of angular movement about the axis of the pinion, or it may be journalled in a gear case attached to the motor frame and the motor mounted in guides or the equivalent so that it is capable of limited sliding movement lengthwise of the locomotive frame.

In an embodiment of the invention applicable to the coupling of an electric motor to the driving wheel of an electrically propelled locomotive, the gear wheel, which meshes with the pinion upon or connected to the motor shaft, is journalled in a gear case capable of bodily angular movement relatively to the bearing supporting the pinion shaft, and upon said gear wheel are located parallel with the axis thereof three studs or cranks spaced 120 degrees apart and projecting towards the driving wheel whereon are disposed three corresponding studs or cranks.

Mutually adjacent pairs of said studs or cranks are coupled by approximately horizontal links whereby the driving wheel is free to move vertically.

Means are preferably provided for lubricating the coupling and may comprise an oil ring carried by the pinion shaft and rotating in an oil bath formed in or on one of the pinion shaft bearings from which oil flows to the pinion and gear wheel bearings and is conveyed to the cranks, those on the driving wheel being lubricated by means of pipes connecting the two ends of each link.

In order to equalize the load on its two gear wheels irrespective of inaccurate fitting or of wear, the motor may be mounted so as to be capable of limited angular movement about a vertical axis.

The above described embodiment of the invention and a modification thereof are illustrated by way of example in the following drawings, in which:—

Figure 2:
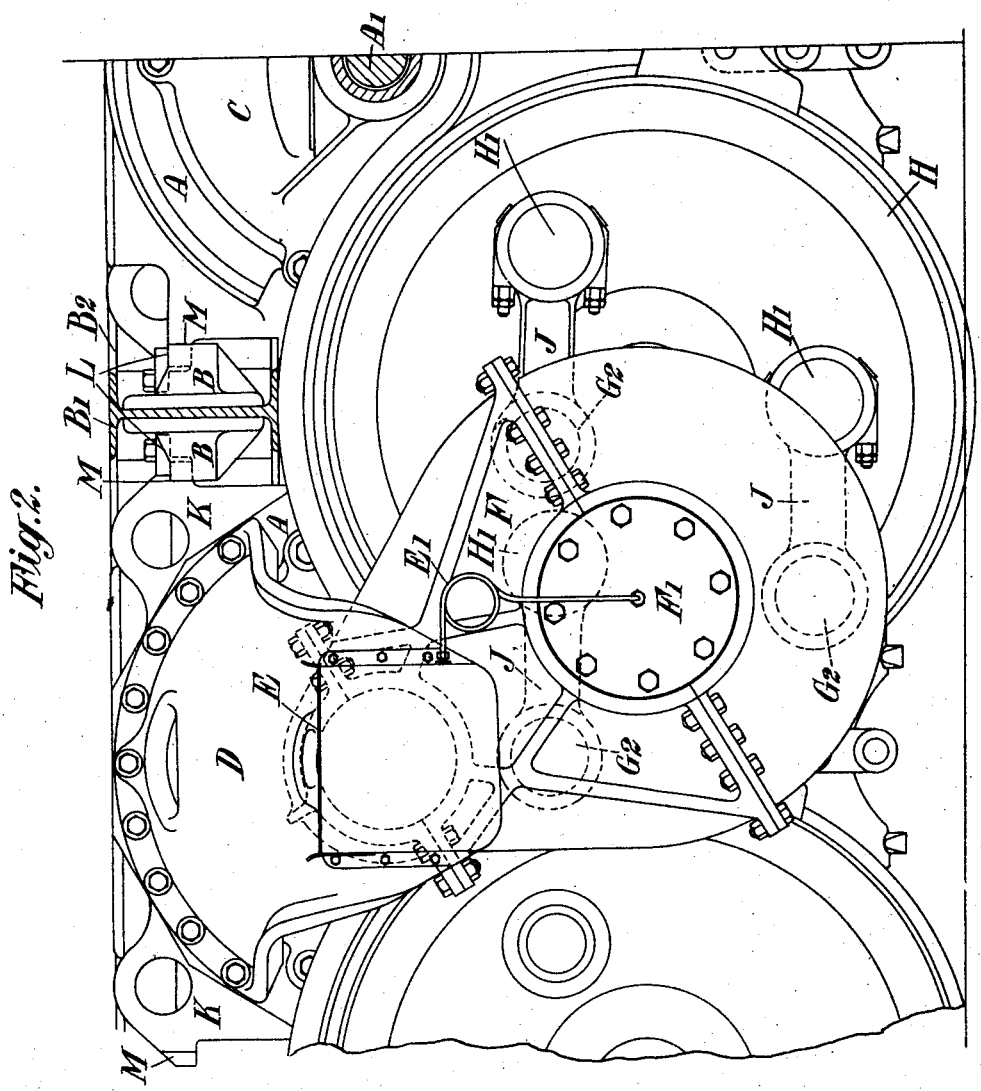
Figure 3:
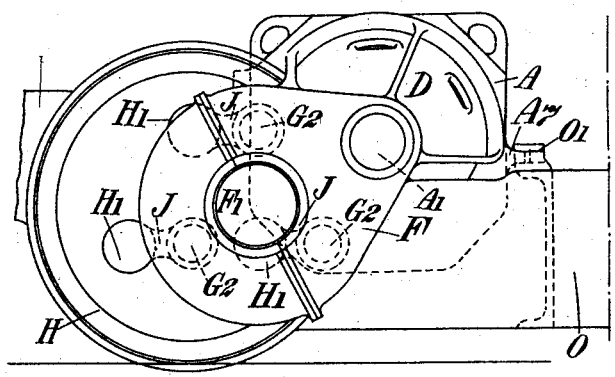

Figure 1 is a half elevation half sectional elevation transversely of a locomotive frame fitted with the drive of this invention, Figure 2 is a side view of the coupling assembly, and Figure 3 is a side view of the coupling as applied to the bogie of an electric locomotive.

A is the motor which is supported by brackets B secured to the cross members B1 of the frame B2.

The motor A is arranged to drive from both ends of its shaft A1 upon which are keyed pinions A2.

C is the end frame of the motor and is formed at each end with a bearing C1 for the armature shaft A1 and is also extended at each end to form a journal C2.

A bracket D is bolted to each end of the end frame C and is formed with a journal D1 serving also as a housing for a roller bearing A3 at each outer end of the armature shaft A1 exteriorly of which each bracket D has an oil box E attached to it, within which oil box an oil ring A4 running on each grooved end of shaft A1 collects oil.

Fitted pivotally on the aforesaid journals C2 and D1 at each end of frame C is a gear case F which is preferably made in three parts bolted together and which carries a centre F1 forming a journal for a gear wheel G supported by ball or roller bearings and meshing with the pinion A2.

An oil ring A5 running in a groove or slot in a bush A6 and dipping into an oil bath C3 formed on the frame C at each end of the motor serves to lubricate the armature shaft passing through the bearings C1.

Upon the web G1 of each gear wheel G are located, parallel with the axis thereof, three ball ended cranks G2 spaced 120 degrees apart and projecting towards each driving wheel H whereon are disposed three corresponding cranks H1.

Mutually adjacent pairs of cranks G2 and H1 are coupled by approximately horizontal links J or connecting rods that all lie in the same vertical plane and whereby the driving wheel H is free to move vertically, the length of each link J being less than the distance separating the centres of the groups of cranks G2 and those H1.

Lubrication of the coupling is effected by means of a pipe E1 which is carried from each of the aforesaid oil boxes E to the centre F1 of the corresponding gear case F, the oil passing out of centre F1 through one of the bearings and thence through three passages G3 drilled in the web G1 of each gear wheel and communicating with passages G4 drilled in the cranks G2, the links or connecting rods J being similarly drilled (not shown) to enable the oil to pass to the cranks H1 of the driving wheel H.

In order to enable the motor A to move about a vertical axis so that the load on the gear wheels G is equalized irrespective of wear or inaccurate fitting, the flanges K are cast on each side of its casing or frame which flanges rest on the brackets B; the motor being prevented from rising by plates L bolted to said brackets B.

For the purpose of ensuring that the motor is only capable of turning about a vertical axis, the four corners M of the flanges are formed as portions of a cylinder of which the axis is vertical and these corners M fit correspondingly shaped faces at the ends of the brackets B.

This angular movement of the motor A about a vertical axis will have for effect to shift the gear case F about its pivotal centre, thus altering the relative positions of the teeth of the pinion A2 and the gear wheel G. In practice the motor A will assume a position in which the load on the two gear wheels G is equal and it will remain in that position.

If desired the gear case F may, in some cases, be provided with a strut or radius rod connecting it with the locomotive or other frame, which connection may be resilient.

Figure 3 illustrates a modified arrangement of the coupling which is applicable when the motor which drives the gear wheel is mounted on the bogie of an electric locomotive.

In this case the bracket D which supports the gear case F is cast solid with the gear case, and, in order to allow for any slight variation in the position of the axle of the driving wheel H, which may arise owing to wear in the axle box guides or to inaccurate fitting, the motor A is mounted so that it is capable of sliding to a limited extent lengthwise of the bogie frame O; the motor casing being formed with lugs or projections A7 which are received in guide brackets O1 on the frame O, or the sliding connection may be effected otherwise suitably.

It will be obvious that the above described form of coupling with eccentric gear wheel can be used on locomotives and like vehicles propelled by a motor other than an electric motor.

What I claim is:—

1. A coupling for connecting an eccentric rotary member such as a gear wheel to the driving wheel of a locomotive or like vehicle comprising three or more approximately horizontal links which all lie in the same plane and are each equal in length to the eccentricity of the gear wheel with respect to the driving wheel and which are connected at one end by universal joints to cranks arranged on the driving wheel symmetrically about its axis and which are connected at the other end by universal joints to cranks arranged on the gear wheel or on some part connected with the gear wheel symmetrically about its axis, the distance between a pair of adjacent cranks on the driving wheel or on the gear wheel being greater than the length of each link.

2. A coupling for connecting an eccentric rotary member such as a gear wheel to the driving wheel of a locomotive or like vehicle comprising a gear wheel mounted so that the horizontal distance between its axis and the axle box guides may vary to a limited extent and three or more approximately horizontal links which all lie in the same plane and are each equal in length to the eccentricity of the gear wheel with respect to the driving wheel and which are connected at one end by universal joints to cranks arranged on the driving wheel symmetrically about its axis and which are connected at the other end by universal joints to cranks arranged on the gear wheel or on some part connected with the gear wheel symmetrically about its axis, the distance between a pair of adjacent cranks on the driving wheel or on the gear wheel being greater than the length of each link.

3. A coupling for connecting an eccentric rotary member such as a gear wheel to the driving wheel of a locomotive or like vehicle comprising a gear wheel capable of angular movement about the axis of the pinion with which it meshes and three or more approximately horizontal links which all lie in the same plane and are each equal in length to the eccentricity of the gear wheel with respect to the driving wheel and which are connected at one end by universal joints to cranks arranged on the driving wheel symmetrically about its axis and which are connected at the other end by universal joints to cranks arranged on the gear wheel or on some part connected with the gear wheel symmetrically about its axis, the distance between a pair of adjacent cranks on the driving wheel or on the gear wheel being greater than the length of each link.

4. A coupling for connecting an eccentric gear wheel to the driving wheel of a locomotive or like vehicle comprising a gear wheel journalled in a gear case which is capable of angular movement about the axis of the pinion and three or more approximately horizontal links which all lie in the same plane and are each equal in length to the eccentricity of the gear wheel with respect to the driving wheel and which are connected at one end by universal joints to cranks arranged on the driving wheel symmetrically about its axis and which are connected at the other end by universal joints to cranks arranged on the gear wheel or on some part connected with the gear wheel symmetrically about its axis, the distance between a pair of adjacent cranks on the driving wheel or on the gear wheel being greater than the length of each link.

5. A coupling for connecting an eccentric gear wheel to the driving wheel of a locomotive or like vehicle comprising a motor capable of limited angular movement about a vertical axis, a gear wheel capable of limited movement lengthwise of the locomotive frame, and three or more approximately horizontal links which all lie in the same plane and are each equal in length to the eccentricity of the gear wheel with respect to the driving wheel and which are connected at one end by universal joints to cranks arranged on the driving wheel symmetrically about its axis and which are connected at the other end to cranks arranged on the gear wheel or on some part connected with the gear wheel symmetrically about its axis, the distance between a pair of adjacent cranks on the driving wheel or on the gear wheel being greater than the length of each link.

6. A coupling for connecting an eccentric gear wheel to the driving wheel of a locomotive or like vehicle comprising a motor capable of limited longitudinal movement in the locomotive frame, a gear wheel meshing with a pinion on the motor shaft and journalled in a gear case which is rigidly attached to the motor frame, and three or more approximately horizontal links which all lie in the same plane and are each equal in length to the eccentricity of the gear wheel with respect to the driving wheel and which are connected at one end by universal joints to cranks arranged on the driving wheel symmetrically about its axis and which are connected at the other end by universal joints to cranks arranged on the gear wheel or on some part connected with the gear wheel symmetrically about its axis, the distance between a pair of adjacent cranks on the gear wheel or on the driving wheel being greater than the length of each link.

7. A coupling for connecting an eccentric rotary member such as a gear wheel to the driving wheel of a locomotive or like vehicle comprising three or more approximately horizontal links which all lie in the same plane and are each equal in length to the eccentricity of the gear wheel with respect to the driving wheel and which are connected at one end by universal joints to cranks arranged on the driving wheel symmetrically about its axis and which are connected at the other end to cranks arranged on the gear wheel or on some part connected with the gear wheel symmetrically about its axis, the coupling being characterized by a lubricant chamber in communication with the two halves of the coupling and means whereby lubricant is distributed from the chamber to the working parts of the coupling.

8. A coupling for connecting an eccentric rotary member such as a gear wheel to the driving wheel of a locomotive or like vehicle comprising three or more approximately horizontal links which all lie in the same plane and are each equal in length to the eccentricity of the gear wheel with respect to the driving wheel and which are connected universally at one end to the driving wheel at points symmetrically about its axis and which are connected universally at the other end to the gear wheel symmetrically about its axis, the distance between a pair of adjacent connections on the driving wheel or on the gear wheel being greater than the length of each link.

9. A coupling for connecting an eccentric rotary member such as a gear wheel to the driving wheel of a locomotive or like vehicle comprising three or more approximately horizontal links which all lie in the same plane and are each equal in length to the eccentricity of the gear wheel with respect to the driving wheel and which are connected universally at one end by cranks borne by said links fitting into sockets arranged in the driving wheel symmetrically about its axis and which are connected universally at the other end by cranks borne by said links fitting into sockets arranged in the gear wheel or some other part connected with the gear wheel symmetrically about its axis, the distance between a pair of adjacent sockets in the driving wheel or in the gear wheel being greater than the length of each link.

10. A coupling for connecting an eccentrically mounted driven member to a driving wheel comprising a plurality of links all of which lie in the same plane and are each equal in length to the eccentricity of the driven member with respect to the driving wheel, means for connecting one end of each of said links to said driving wheel symmetrically about the axis of the latter, means for connecting the opposed ends of said links to said driven member and the distance between any pair of adjacent points of connection between said links and said driven member or driving wheel being greater than the length of any one of said links.

In testimony whereof he affixes his signature.

HENRY LLEWELYN KINGSMILL.